United States Patent
Song et al.

(10) Patent No.: US 9,155,057 B2
(45) Date of Patent: Oct. 6, 2015

(54) FEMTOCELL SYNCHRONIZATION ENHANCEMENTS USING ACCESS PROBES FROM COOPERATING MOBILES

(75) Inventors: Bongyong Song, San Diego, CA (US); Kaushik Chakraborty, San Diego, CA (US); Samir Salib Soliman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 13/461,517

(22) Filed: May 1, 2012

(65) Prior Publication Data

US 2013/0294425 A1 Nov. 7, 2013

(51) Int. Cl.
*H04W 56/00* (2009.01)

(52) U.S. Cl.
CPC ...... *H04W 56/0015* (2013.01); *H04W 56/0025* (2013.01)

(58) Field of Classification Search
CPC .................................. H04W 56/001–56/0025
USPC .............. 370/350, 503; 455/13.2, 502, 456.5, 455/524–525
See application file for complete search history.

(56) References Cited

U.S. PATENT DOCUMENTS

| | | | |
|---|---|---|---|
| 5,872,774 A | 2/1999 | Wheatley, III | |
| 5,898,929 A | 4/1999 | Haartsen | |
| 6,151,311 A | 11/2000 | Wheatley, III | |
| 6,307,840 B1 | 10/2001 | Wheatley, III | |
| 6,433,739 B1 | 8/2002 | Soliman | |
| 6,590,881 B1 | 7/2003 | Wallace et al. | |
| 6,847,630 B2 | 1/2005 | Blanz et al. | |
| 6,970,708 B1 | 11/2005 | Raith | |
| 6,983,031 B2 | 1/2006 | Wheatley | |
| 7,295,531 B2 | 11/2007 | Wheatley et al. | |
| 7,391,759 B2 | 6/2008 | Wallace et al. | |
| 7,512,111 B2 | 3/2009 | Kauhanen | |
| 7,929,970 B1 | 4/2011 | Gunasekara et al. | |
| 8,226,340 B1 * | 7/2012 | Mahalingam | 411/411 |
| 8,244,257 B2 | 8/2012 | Walldeen et al. | |
| 8,249,189 B2 | 8/2012 | Aoki et al. | |
| 8,355,713 B1 | 1/2013 | Oh et al. | |
| 2003/0114204 A1 | 6/2003 | Allen et al. | |

(Continued)

FOREIGN PATENT DOCUMENTS

| | | |
|---|---|---|
| CN | 1398079 A | 2/2003 |
| CN | 1875648 A | 12/2006 |

(Continued)

OTHER PUBLICATIONS

Motorola: "PCID confusion", R2-092307, 3GPP TSG RAN WG2 #65bis Mar. 23-27, 2009, Seoul, Korea, pp. 1-3.

(Continued)

*Primary Examiner* — Habte Mered
(74) *Attorney, Agent, or Firm* — Liberty E. Mann

(57) ABSTRACT

Femtocell synchronization is disclosed, in which a femtocell transmits a request over an out-of-band (OOB) link to a proximate mobile device for synchronization assistance. In response to the request, the mobile device transmits an access probe to a serving macro base station. The femtocell detects the access probe and uses aiding information to decode the access probe to determine the timing and/or frequency information. The femtocell uses this timing and/or frequency information for its synchronization.

56 Claims, 9 Drawing Sheets

(56) References Cited

U.S. PATENT DOCUMENTS

| | | |
|---|---|---|
| 2003/0123666 A1 | 7/2003 | Sambhwani et al. |
| 2003/0194992 A1 | 10/2003 | Kim et al. |
| 2004/0043746 A1 | 3/2004 | Hiramatsu |
| 2005/0058097 A1 | 3/2005 | Kang et al. |
| 2005/0094589 A1 | 5/2005 | Camp et al. |
| 2005/0099972 A1 | 5/2005 | Motegi et al. |
| 2005/0130672 A1 | 6/2005 | Dean et al. |
| 2005/0186933 A1 | 8/2005 | Trans |
| 2006/0293067 A1 | 12/2006 | Leung et al. |
| 2007/0053340 A1 | 3/2007 | Guilford |
| 2007/0093268 A1 | 4/2007 | Hosono et al. |
| 2007/0230393 A1 | 10/2007 | Sinha et al. |
| 2007/0254620 A1 | 11/2007 | Lindqvist et al. |
| 2007/0286136 A1 | 12/2007 | Rittle et al. |
| 2008/0002660 A1 | 1/2008 | Jeong et al. |
| 2008/0176568 A1 | 7/2008 | Palanki et al. |
| 2008/0181195 A1 | 7/2008 | Cho et al. |
| 2008/0188266 A1 | 8/2008 | Carter et al. |
| 2008/0254812 A1 | 10/2008 | Kitazoe |
| 2008/0261596 A1 | 10/2008 | Khetawat et al. |
| 2008/0268856 A1 | 10/2008 | Francalanci et al. |
| 2008/0285529 A1 | 11/2008 | Kwak et al. |
| 2008/0285539 A1 | 11/2008 | Tiedemann, Jr. et al. |
| 2008/0311926 A1 | 12/2008 | Fischer et al. |
| 2009/0067417 A1 | 3/2009 | Kalavade et al. |
| 2009/0086691 A1 | 4/2009 | Balasubramanian |
| 2009/0092122 A1 | 4/2009 | Czaja et al. |
| 2009/0097452 A1 | 4/2009 | Gogic |
| 2009/0131049 A1 | 5/2009 | Osborn |
| 2009/0163216 A1 | 6/2009 | Hoang et al. |
| 2009/0164547 A1* | 6/2009 | Ch'ng et al. ............... 709/201 |
| 2009/0185632 A1 | 7/2009 | Cai et al. |
| 2009/0196266 A1 | 8/2009 | Wu et al. |
| 2009/0210888 A1 | 8/2009 | Lee et al. |
| 2009/0219888 A1 | 9/2009 | Chen et al. |
| 2009/0221303 A1 | 9/2009 | Soliman |
| 2009/0247084 A1 | 10/2009 | Palanki |
| 2009/0253421 A1 | 10/2009 | Camp, Jr. et al. |
| 2009/0258672 A1 | 10/2009 | Camp, Jr. et al. |
| 2009/0290555 A1 | 11/2009 | Alpert et al. |
| 2009/0316591 A1 | 12/2009 | Reial et al. |
| 2009/0316654 A1 | 12/2009 | Prakash et al. |
| 2010/0027694 A1 | 2/2010 | Touboul et al. |
| 2010/0035601 A1 | 2/2010 | Chen et al. |
| 2010/0035629 A1 | 2/2010 | Soliman |
| 2010/0041364 A1 | 2/2010 | Lott et al. |
| 2010/0046494 A1 | 2/2010 | Palanki et al. |
| 2010/0054237 A1* | 3/2010 | Han et al. ............... 370/350 |
| 2010/0061356 A1 | 3/2010 | Qvarfordt et al. |
| 2010/0067433 A1 | 3/2010 | Cheng et al. |
| 2010/0067507 A1 | 3/2010 | Park |
| 2010/0085913 A1 | 4/2010 | Subrahmanya |
| 2010/0105377 A1 | 4/2010 | Iwamura et al. |
| 2010/0111070 A1* | 5/2010 | Hsu ............... 370/350 |
| 2010/0135248 A1 | 6/2010 | Aramaki et al. |
| 2010/0136997 A1 | 6/2010 | Palanki et al. |
| 2010/0141400 A1 | 6/2010 | Radulescu et al. |
| 2010/0150109 A1 | 6/2010 | Bradley et al. |
| 2010/0157906 A1* | 6/2010 | Yang et al. ............... 370/328 |
| 2010/0173630 A1 | 7/2010 | Han et al. |
| 2010/0197309 A1 | 8/2010 | Fang et al. |
| 2010/0203891 A1 | 8/2010 | Nagaraja et al. |
| 2010/0210239 A1 | 8/2010 | Karaoguz et al. |
| 2010/0222068 A1 | 9/2010 | Gaal et al. |
| 2010/0242103 A1 | 9/2010 | Richardson et al. |
| 2010/0260168 A1 | 10/2010 | Gheorghiu et al. |
| 2011/0002284 A1 | 1/2011 | Talwar et al. |
| 2011/0019604 A1 | 1/2011 | Chun et al. |
| 2011/0058503 A1 | 3/2011 | Ono |
| 2011/0059739 A1 | 3/2011 | Huang |
| 2011/0098042 A1 | 4/2011 | Mach et al. |
| 2011/0128916 A1 | 6/2011 | Kwon et al. |
| 2011/0158164 A1 | 6/2011 | Palanki et al. |
| 2011/0176483 A1 | 7/2011 | Palanki et al. |
| 2011/0182252 A1 | 7/2011 | Liu et al. |
| 2011/0275402 A1 | 11/2011 | Charipadi et al. |
| 2011/0281571 A1 | 11/2011 | Patel et al. |
| 2011/0281574 A1 | 11/2011 | Patel et al. |
| 2011/0300870 A1 | 12/2011 | Chun et al. |
| 2011/0312317 A1 | 12/2011 | Sahin et al. |
| 2012/0040659 A1 | 2/2012 | Iwamura et al. |
| 2012/0044908 A1* | 2/2012 | Spinelli et al. ............... 370/331 |
| 2012/0046025 A1 | 2/2012 | Das et al. |
| 2012/0046026 A1 | 2/2012 | Chande et al. |
| 2012/0046063 A1 | 2/2012 | Chande et al. |
| 2012/0052793 A1 | 3/2012 | Brisebois et al. |
| 2012/0052855 A1* | 3/2012 | Soliman et al. ............ 455/422.1 |
| 2012/0069800 A1 | 3/2012 | Soliman et al. |
| 2012/0094663 A1 | 4/2012 | Awoniyi et al. |
| 2012/0115496 A1 | 5/2012 | Soliman et al. |
| 2012/0142392 A1 | 6/2012 | Patel et al. |
| 2012/0178482 A1 | 7/2012 | Seo et al. |
| 2012/0184206 A1 | 7/2012 | Kim et al. |
| 2013/0005326 A1 | 1/2013 | Flanagan |
| 2013/0059592 A1 | 3/2013 | Chakraborty et al. |
| 2013/0095789 A1* | 4/2013 | Keevill et al. ............... 455/411 |
| 2014/0134997 A1 | 5/2014 | Song et al. |

FOREIGN PATENT DOCUMENTS

| | | |
|---|---|---|
| CN | 101155167 A | 4/2008 |
| EP | 1089499 A2 | 4/2001 |
| EP | 1809056 A2 | 7/2007 |
| EP | 1871035 A1 | 12/2007 |
| GB | 2446192 | 8/2008 |
| JP | 6334593 A | 12/1994 |
| JP | 2002505542 A | 2/2002 |
| JP | 2004112225 A | 4/2004 |
| JP | 2005184824 A | 7/2005 |
| JP | 2007534221 A | 11/2007 |
| JP | 2007536788 A | 12/2007 |
| JP | 2008172380 A | 7/2008 |
| JP | 4352281 B1 | 10/2009 |
| JP | 2009232434 A | 10/2009 |
| JP | 2009239568 A | 10/2009 |
| JP | 2010041537 A | 2/2010 |
| JP | 2010512054 A | 4/2010 |
| JP | 2010166163 A | 7/2010 |
| KR | 20100034579 A | 4/2010 |
| TW | 200926649 | 6/2009 |
| WO | 9809390 A1 | 3/1998 |
| WO | WO-99037037 | 7/1999 |
| WO | WO-9944306 A1 | 9/1999 |
| WO | WO-03043229 A1 | 5/2003 |
| WO | WO-2005048628 A1 | 5/2005 |
| WO | WO-2005109767 A1 | 11/2005 |
| WO | 2008066957 A2 | 6/2008 |
| WO | 2008094334 A1 | 8/2008 |
| WO | 2008139707 A1 | 11/2008 |
| WO | WO-2008140225 A1 | 11/2008 |
| WO | 2009006041 A1 | 1/2009 |
| WO | 2009049207 A2 | 4/2009 |
| WO | 2010017226 A2 | 2/2010 |
| WO | WO-2010022371 | 2/2010 |
| WO | 2010033438 | 3/2010 |
| WO | WO-2010033413 | 3/2010 |
| WO | WO 2011/109466 * 9/2011 ............ H04W 56/00 |  |  |

OTHER PUBLICATIONS

Qualcomm Europe: "Network support for inbound handover of pre-Rel-9 UMTS UEs", R3-091213, 3GPP TSG RAN WG 3 #64, May 4-8, 2009 San Francisco, USA, pp. 1-3.

International Search Report and Written Opinion—PCT/US2013/039127—ISA/EPO—Jul. 11, 2013.

Damnjanovic et al., "A Survey on 3GPP Heterogeneous Networks", IEEE Wireless Communications, pp. 10-21 (Jun. 2011).

Domenico A.D., et al., "A Survey on MAC Strategies for Cognitive Radio Networks", IEEE Communications Surveys, IEEE, New York, NY, US, vol. 14, No. 1, Jan. 1, 2012, pp. 21-44, XP011420410, ISSN: 1553-877X, DOI: 10.1109/SURV.2011.111510.00108.

3GPP TR 36.922 version 9.0.0 Release 9; LTE; Evolved Universal Terrestrial Radio Access (E-UTRA);TDD Home eNode B (HeNB)

(56) References Cited

OTHER PUBLICATIONS

Radio Frequency (RF) requirments analysis, ETSI TR 136 922 V9.0.0, pp. 1-77, Apr. 2010.

"3rd Generation Partnership Project; Technical Specification Group Radio Access Network; Evolved Universal Terrestrial Radio Access (E-UTRA); TDD Home eNode B (HeNB) Radio Frequency (RF) requirements analysis (Release 9)", 3GPP Standard; 3GPP TR 36.922, 3rd Generation Partnership Project (3GPP), Mobile Competence Centre; 650, Route Des Lucioles; F-06921 Sophia-Antipolis Cedex; France, No. V9.1.0, Jun. 21, 2010, pp. 1-74, XP050441979, [retrieved on Jun. 21, 2010].

3rd Generation Partnership Project, Technical Specification Group Radio Access Networks, Home Node B Radio Frequency (RF) Requirements (FDD) (Release 9), 3GPP Standard, 3GPP TR 25.967, 3rd Generation Partnership Project (3GPP), Mobile Competence Centre, 650, Route Des Lucioles, F-06921 Sophia-Antipolis Cedex, France, No. 9.0.0, May 1, 2009, pp. 1-55, XP050369580, paragraph [0007].

Co-pending U.S. Appl. No. 61/094,100, filed Sep. 4, 2008.

LG Electronics: "Methods to facilitate the inter-cell coordination in heterogeneous networks", 3GPP Draft; R1-105358 Coordination Method, 3rd Generation Partnership Project (3GPP), Mobile Competence Centre; 650, Route Des Lucioles; F-06921 Sophia-Antipolis Cedex ; France, vol. RAN WG1, No. Xi'an; 20101011, Oct. 5, 2010, XP050450509, [retrieved on Oct. 5, 2010].

Mediatek Inc: "Further Discussion on HeNB Downlink Power Setting in HetNet", 3GPP Draft; R1-105238 Power Setting in Hetnet, 3rd Generation Partnership Project (3GPP), Mobile Competence Centre; 650, Route Des Lucioles; F-06921 Sophia-Antipolis Cedex; France, vol. RAN WG1, No. Xi'an; 20101011, Oct. 5, 2010, XP050450424, [retrieved on Oct. 5, 2010].

Mitsubishi Electric: "Dynamic Setup of HNBs for Energy Savings and Interference Reduction", 3GPP Draft; R3-081949 (Dynamic Setup HNBS), 3rd Generation Partnership Project (3GPP), Mobile Competence Centre; 650, Route Des Lucioles; F-06921 Sophia-Antipolis Cedex; France, vol . RAN WG3, No. Jeju Island; 20080813, Aug. 13, 2008, XP050165010, [retrieved on Aug. 13, 2008].

Qualcomm Europe et al., "TDD HeNB Synchronization Requirement for Large Propagation Distance Case", 3GPP Draft, R4-094985, 3rd Generation Partnership Project (3GPP), Mobile Competence Centre, 650, Route Des Lucioles, F-06921 Sophia-Antipolis Cedex, France, No. Jeju, 20091109, Nov. 9, 2009, XP050394434, [retrieved on Nov. 17, 2009].

Qualcomm Europe: "HeNB Timing Requirements", 3GPP Draft, R4-091902 Timing Requirements, 3rd Generation Partnership Project (3GPP), Mobile Competence Centre, 650, Route Des Lucioles, F-06921 Sophia-Antipolis Cedex, France, No. San Francisco, 20090427, Apr. 27, 2009, XP050342629, [retrieved on Apr. 27, 2009] paragraph [0002].

Qualcomm Europe: "Text Proposal on TDD HeNB Synchronization Requirement", 3GPP Draft, R4-093725 Text Proposal for HENB Sync, Requirements, 3rd Generation Partnership Project (3GPP), Mobile Competence Centre, 650, Route Des Lucioles, F-06921 Sophia-Antipolis Cedex, France, No. Miyazaki, 20091012, Oct. 12, 2009, XP050393326, [retrieved on Oct. 6, 2009].

Qualcomm Europe: "Synchronization Requirements and Techniques", 3GPP Draft, R4-091336, 3rd Generation Partnership Project (3GPP), Mobile Competence Centre, 650, Route Des Lucioles, F-06921 Sophia-Antipolis Cedex, France, No. Seoul, Korea, 20090319, Mar. 19, 2009, XP050342103, [retrieved on Mar. 19, 2009].

Universal Mobile Telecommunications System (UMTS), Physical layer, Measurements (TDD) (3GPP TS 25.225 version 8.2.0 Release 8), ETSI TS 125 225, ETSI Standard, European Telecommunications Standards Institute (ETSI), Sophia Antipolis Cedex, France, vol. 3-R1, No. V8.2.0, Mar. 1, 2009, XP014043978, paragraph [0007].

Yavuz M., et al., "Interference management and performance analysis of UMTS/HSPA+ femtocells", IEEE Communications Magazine, IEEE Service Center, Piscataway, US, vol. 47, No. 9, Sep. 1, 2009, pp. 102-109, XP011283371, ISSN: 0163-6804, DOI: 10.1109/MCOM.2009.5277462.

* cited by examiner

FEMTOCELL SYNCHRONIZATION ENHANCEMENTS USING ACCESS PROBES FROM COOPERATING MOBILES

BACKGROUND

1. Field

Aspects of the present disclosure relate generally to wireless communication systems, and more particularly, to femtocell synchronization timing acquisition and maintenance.

2. Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or NodeBs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

In recent years, users have started to replace fixed line broadband communications with mobile broadband communications and have increasingly demanded great voice quality, reliable service, and low prices, especially at their home or office locations. In order to provide indoor services, network operators may deploy different solutions. For networks with moderate traffic, operators may rely on macro cellular base stations to transmit the signal into buildings. However, in areas where building penetration loss is high, it may be difficult to maintain acceptable signal quality, and thus other solutions are desired. New solutions are frequently desired to make the best of the limited radio resources such as space and spectrum. Some of these solutions include intelligent repeaters, remote radio heads, pico cells, and femtocells.

The Femto Forum, a non-profit membership organization focused on standardization and promotion of femtocell solutions, defines femto access points (FAPs), also referred to as femtocell units, to be low-powered wireless access points that operate in licensed spectrum and are controlled by the network operator, can be connected with existing handsets, and use a residential digital subscriber line (DSL) or cable connection for backhaul. In various standards or contexts, a FAP may be referred to as a home NodeB (HNB), home evolved NodeB (HeNB), access point base station, etc.

In order to keep the expenses low, it is desired for FAPs to require very little for installation and setup. This means that a FAP may be designed to auto-configure itself such that the user only needs to plug in the cables for the internet connection and electricity, and the timing and frequency synchronization of the FAP with the macro cell is taken care of automatically.

SUMMARY

Femtocell synchronization is disclosed, in which a femtocell transmits a request over an out-of-band (OOB) link to a proximate mobile device for synchronization assistance. In response to the request, the mobile device transmits an access probe to a serving macro base station. The femtocell detects the access probe and uses aiding information to decode the access probe to determine the timing and/or frequency information. The femtocell uses this timing and/or frequency information for its synchronization.

In some aspects, a method of wireless communication includes receiving, at a mobile device, a request for synchronization assistance from a proximate femtocell, wherein the request is received over an out of band (OOB) link. An access probe is transmitted to a serving macro base station in response to the request. Aiding information is transmitted to the proximate femtocell over the OOB link, wherein the aiding information assists the proximate femtocell in decoding the access probe.

In other aspects, an apparatus configured for wireless communication has means for receiving, at a mobile device, a request for synchronization assistance from a proximate femtocell, wherein the request is received over an out of band (OOB) link. The apparatus also has means for transmitting an access probe to a serving macro base station in response to the request. The apparatus further has means for transmitting aiding information to the proximate femtocell over the OOB link, wherein the aiding information assists the proximate femtocell in decoding the access probe.

In additional aspects, a computer program product for wireless communications in a wireless network includes a non-transitory computer-readable medium having program code recorded thereon. The program code includes program code to receive, at a mobile device, a request for synchronization assistance from a proximate femtocell, wherein the request is received over an out of band (OOB) link. The program code also includes program code to transmit an access probe to a serving macro base station in response to the request. The program code further includes program code to transmit aiding information to the proximate femtocell over the OOB link, wherein the aiding information assists the proximate femtocell in decoding the access probe.

In further aspects, an apparatus configured for wireless communication includes at least one processor and a memory coupled to the at least one processor. The at least one processor is configured to receive, at a mobile device, a request for synchronization assistance from a proximate femtocell, wherein the request is received over an out of band (OOB) link. The at least one processor is additionally configured to transmit an access probe to a serving macro base station in response to the request. The at least one processor is also configured to transmit aiding information to the proximate femtocell over the OOB link, wherein the aiding information assists the proximate femtocell in decoding the access probe.

In still other aspects, a method of wireless communication includes detecting, by a femtocell, one or more access probes transmitted from one or more proximate mobile devices. The method also includes determining at least one of access probe transmission time or frequency based on the one or more access probes. The method additionally includes synchronizing at least one of timing or frequency at the femtocell using the determined at least one of access probe transmission time or frequency, wherein the synchronizing comprises initializing at least one of the timing or frequency using the at least one of access probe transmission time or frequency.

In yet additional aspects, an apparatus configured for wireless communication has means for detecting, by a femtocell, one or more access probes transmitted from one or more proximate mobile devices. The apparatus additionally has means for determining at least one of access probe transmission time or frequency based on the one or more access probes. The apparatus also has means for synchronizing at least one of timing or frequency at the femtocell using the determined at least one of access probe transmission time or frequency, wherein the means for synchronizing comprises means for initializing the at least one of timing or frequency using the at least one of access probe transmission time or frequency.

In still further aspects, a computer program product for wireless communications in a wireless network includes a non-transitory computer-readable medium having program code recorded thereon. The program code includes program code to detect, by a femtocell, one or more access probes transmitted from one or more proximate mobile devices. The program code additionally includes program code to determine at least one of access probe transmission time or frequency based on the one or more access probes. The program code further includes program code to synchronize at least one of timing or frequency at the femtocell using the determined at least one of access probe transmission time or frequency, wherein the program code to synchronize comprises program code to initialize the at least one of timing or frequency using the at least one of access probe transmission time or frequency.

In yet further aspects, an apparatus configured for wireless communication includes at least one processor and a memory coupled to the at least one processor. The at least one processor is configured to detect, by a femtocell, one or more access probes transmitted from one or more proximate mobile devices. The at least one processor is additionally configured to determine at least one of access probe transmission time or frequency based on the one or more access probes. The at least one processor is also configured to synchronize at least one of timing or frequency at the femtocell using the determined at least one of access probe transmission time or frequency, wherein the configuration to synchronize comprises configuration to initialize the at least one of timing or frequency using the at least one of access probe transmission time or frequency.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95, IS-856, and 1xEV-DO standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (WIFI™), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000®, 1xEV-DO, and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for CDMA2000 and EV-DO networks, and utilize examples and terminology relating to these networks. It should be understood that, in comparison to asynchronous networks, timing synchronization is of increased importance for synchronous networks like CDMA2000 or EV-DO. However, the disclosed methods may be applied to any network, including UMTS and LTE-A. For asynchronous networks, timing synchronization may not be as critical as frequency synchronization. Accordingly, in various embodiments, it should be understood that the disclosed methods may be employed for timing and/or frequency synchronization. In these embodiments, timing offset and/or frequency offset information can be obtained at a femtocell from access probe detection.

Figure 1:
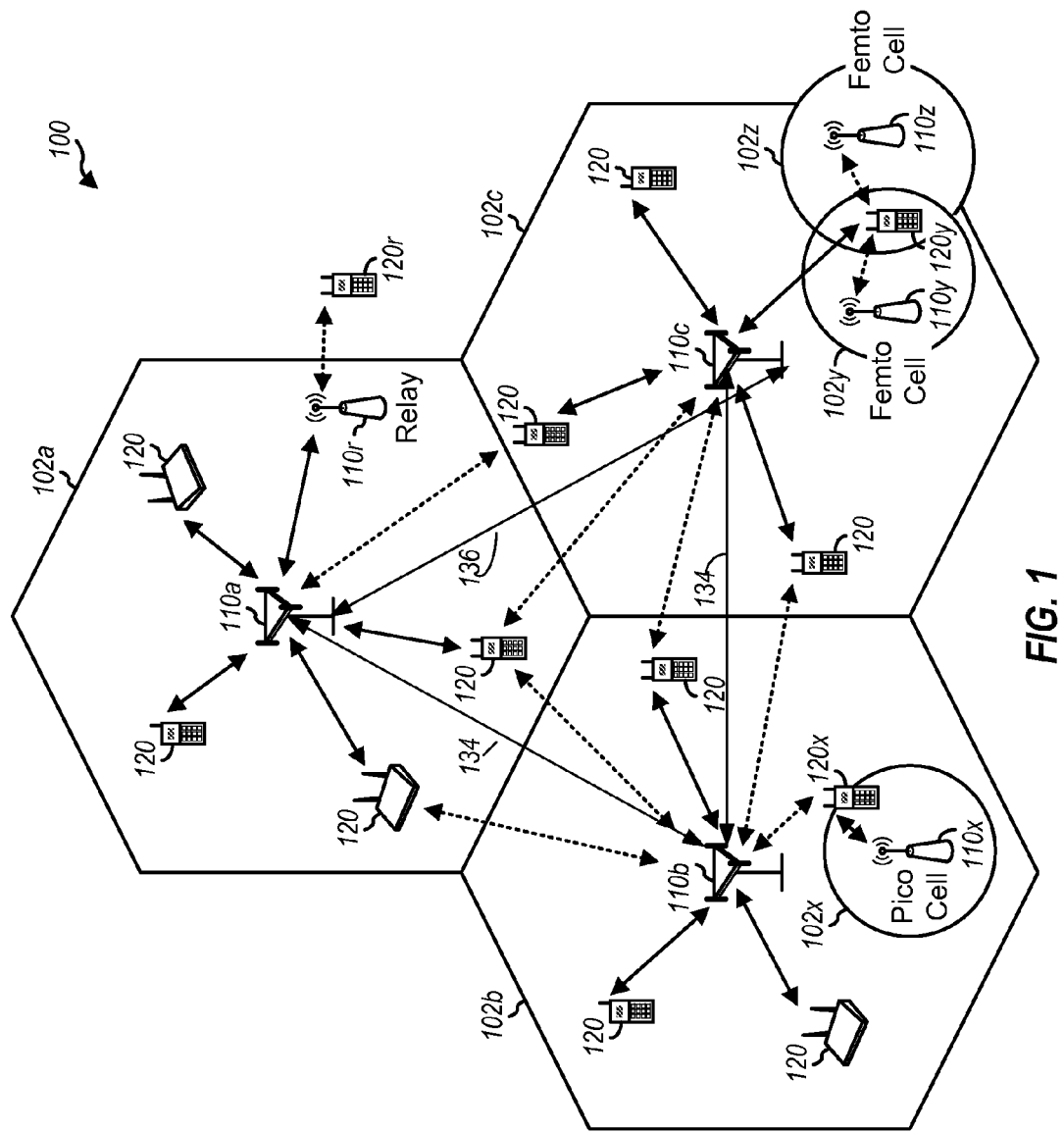
FIG. 1 is a block diagram conceptually illustrating an example of a mobile communication system.

FIG. 1 shows a wireless network 100 for communication, which may be an LTE-A network. The wireless network 100 includes a number of evolved NodeBs (eNBs) 110 and other network entities. An eNB may be a station that communicates with the UEs and may also be referred to as a base station, a NodeB, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femtocell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femtocell would also generally cover a relatively small geographic area (e.g., a home) and, in addition to unrestricted access, may also provide restricted access by UEs having an association with the femtocell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femtocell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femtocells 102y and 102z, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

The wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x and the relay station 110r, which generally transmit at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110y-z typically also transmit at substantially lower power levels (e.g., 100 mW-200 mW) than the macro eNBs 110a-c.

Figure 2:
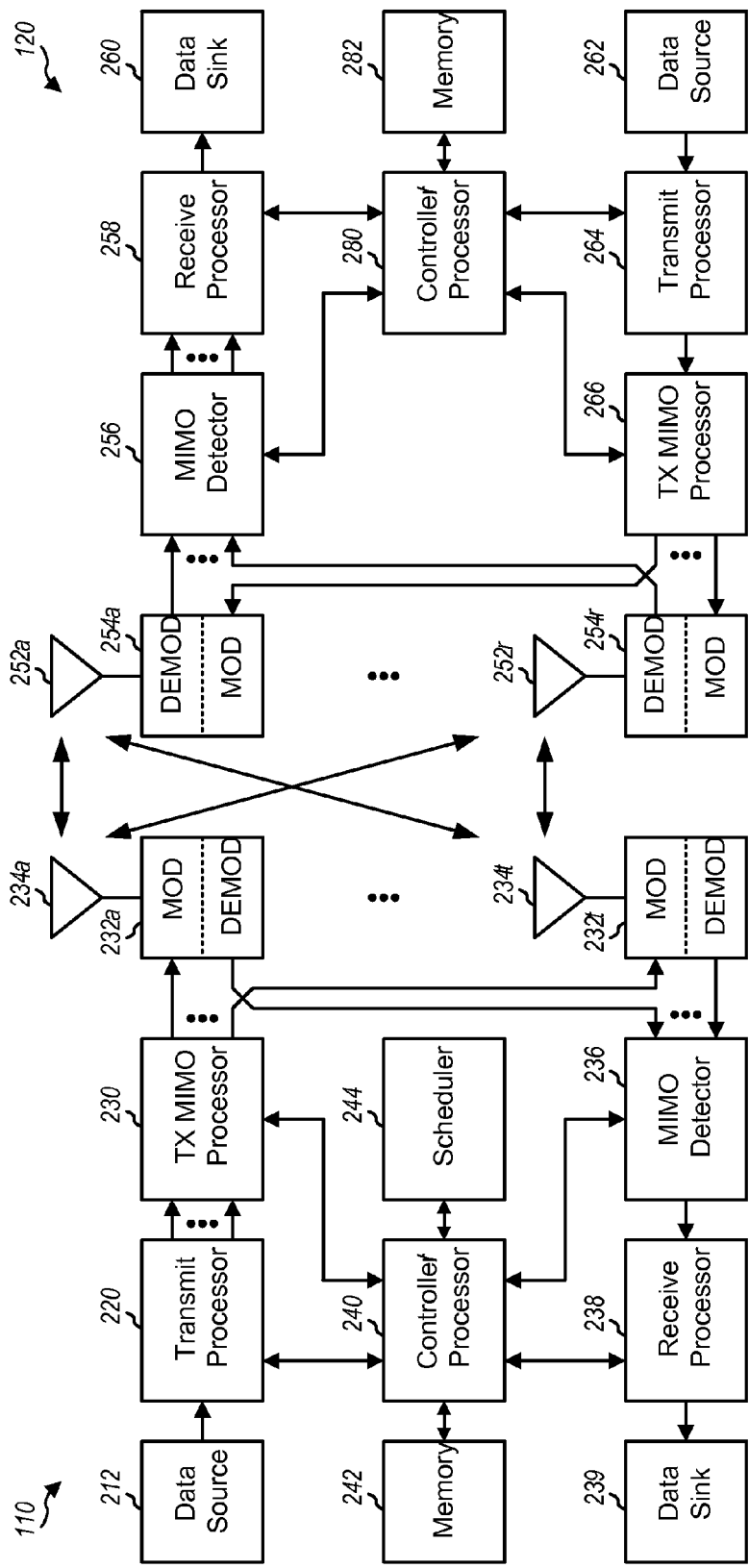
FIG. 2 is a block diagram conceptually illustrating a design of a base station/eNB and a UE configured according to one aspect of the present disclosure.

FIG. 2 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 234a through 234t, and the UE 120 may be equipped with antennas 252a through 252r.

At the eNB 110, a transmit processor 220 may receive data from a data source 212 and control information from a controller/processor 240. The control information may be for the physical broadcast channel (PBCH), physical control format indicator channel (PCFICH), physical hybrid automated repeat request channel (PHICH), physical downlink control channel (PDCCH), etc. The data may be for the physical downlink shared channel (PDSCH), etc. The transmit processor 220 may process (e.g., encode and symbol map) the data and control information to obtain data symbols and control symbols, respectively. The transmit processor 220 may also generate reference symbols, e.g., for the primary synchronization signal (PSS), secondary synchronization signal (SSS), and cell-specific or "common" reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the eNB 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the demodulators 254a through 254r (e.g., for SC-FDM, etc.), and transmitted to the eNB 110. At the eNB 110, the uplink signals from the UE 120 may be received by the antennas 234, processed by the modulators 232, detected by a MIMO detector 236 if applicable, and further processed by a receive processor 238 to obtain decoded data and control information sent by the UE 120. The processor 238 may provide the decoded data to a data sink 239 and the decoded control information to the controller/processor 240.

Figure 8:
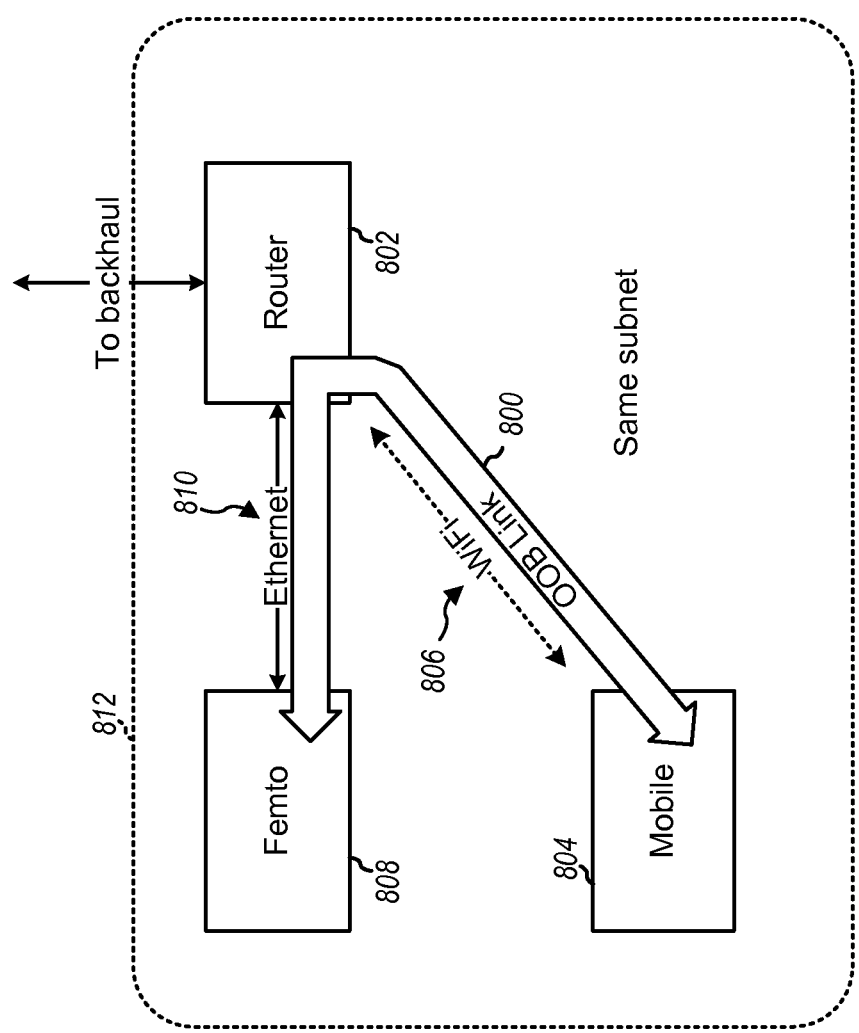
FIG. 8 is a block diagram conceptually illustrating an example of an out of band link according to one aspect of the disclosure.
Figure 9:
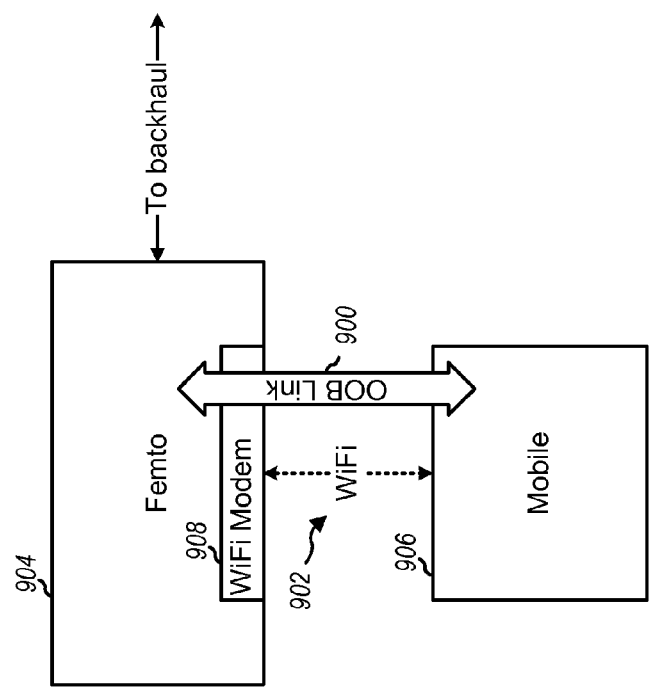
FIG. 9 is a block diagram conceptually illustrating another example of an out of band link according to one aspect of the disclosure.

The controllers/processors 240 and 280 may direct the operation at the eNB 110 and the UE 120, respectively. The controller/processor 240 and/or other processors and modules at the eNB 110 may perform or direct the execution of various processes for the techniques described herein. The controllers/processor 280 and/or other processors and modules at the UE 120 may also perform or direct the execution of the functional blocks illustrated in FIGS. 8 and 9, and/or other processes for the techniques described herein. The memories 242 and 282 may store data and program codes for the eNB 110 and the UE 120, respectively. A scheduler 244 may schedule UEs for data transmission on the downlink and/or uplink.

Figure 3:
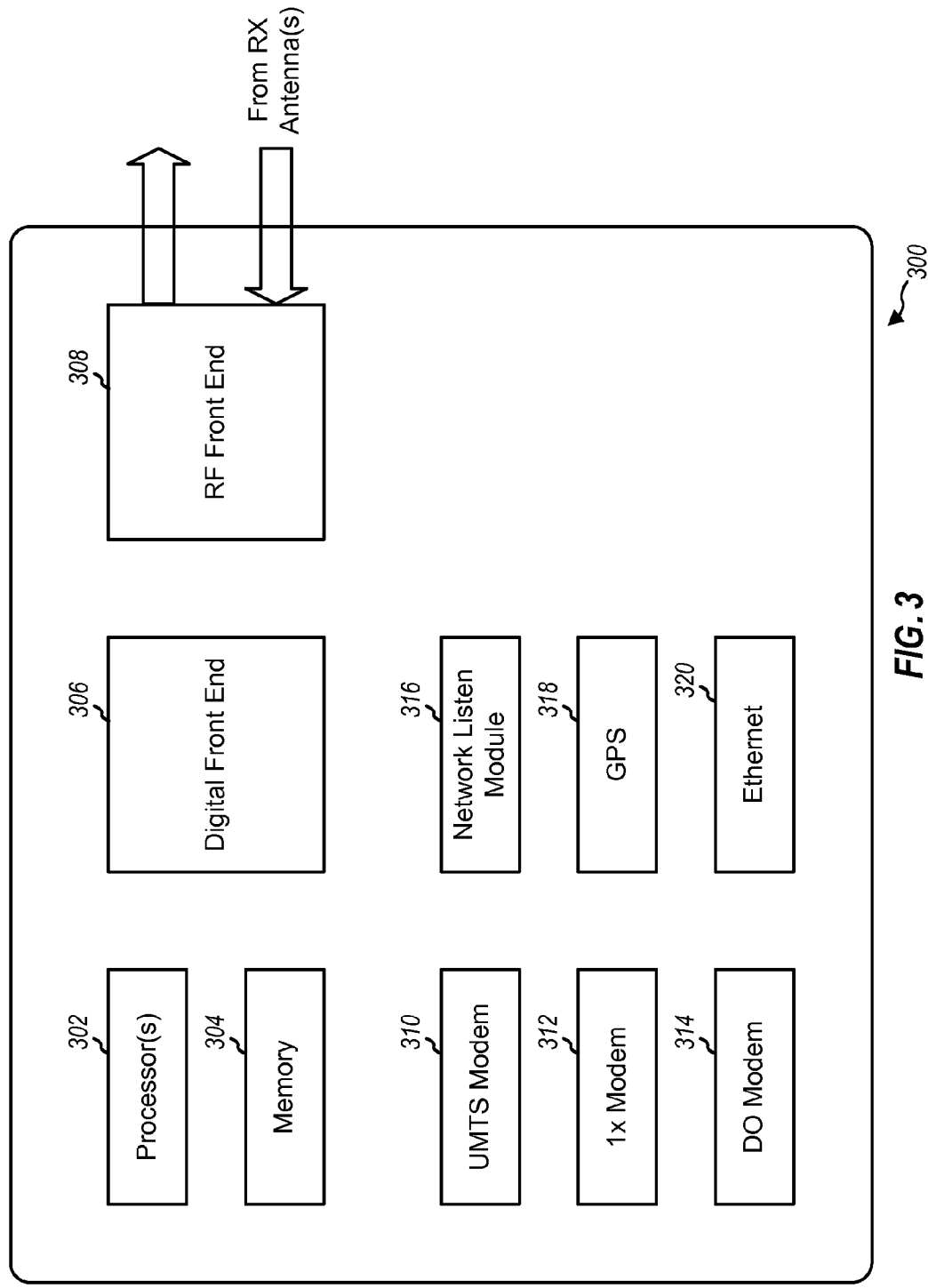
FIG. 3 is a block diagram conceptually illustrating a design of a femtocell configured according to one aspect of the present disclosure.

Turning now to FIG. 3, a femtocell 300 (e.g., either of femtocells 102y and 102z) may have one or more processors 302 and digital memory 304 connected thereto. As will be readily understood by one skilled in the art, programs stored in memory 304 configure processor(s) 302 to interface with digital front end 306 and RF front end 308. As will also be readily understood, programs stored in memory 304 configure processor(s) 302 to operate one or more modems, such as UMTS modem 310, 1x modem 312, DO modem 314, and network listen modem 316. As will further be readily understood, programs stored in memory 304 configure processor(s) 302 to operate GPS firmware 318 and Ethernet firmware 320. While this example is specific to the EV-DO wireless data standard operating with CDMA radio technologies, it should be readily understood that additional or alternative femtocells can have any additional or alternative structurally equivalent types of processors employing structurally equivalent modules operating according to any type of communication protocol suitable for femto operation (e.g., EV-DO, LTE, HSPA+, WiMax, Flash-OFDM, HIPERMAN, Wi-Fi, iBurst, EDGE Evolution, UMTS W-CDMA HSDPA+HSUPA, UMTS-TDD, etc.) and employing any kind of radio technology (e.g., CDMA, FDD, TDD, MIMO, OFDM, Flash-OFDM, OFDMA, MIMO-SOFDMA, SC-FDMA, HC-SCDMA, TDMA, etc.)

Figure 4:
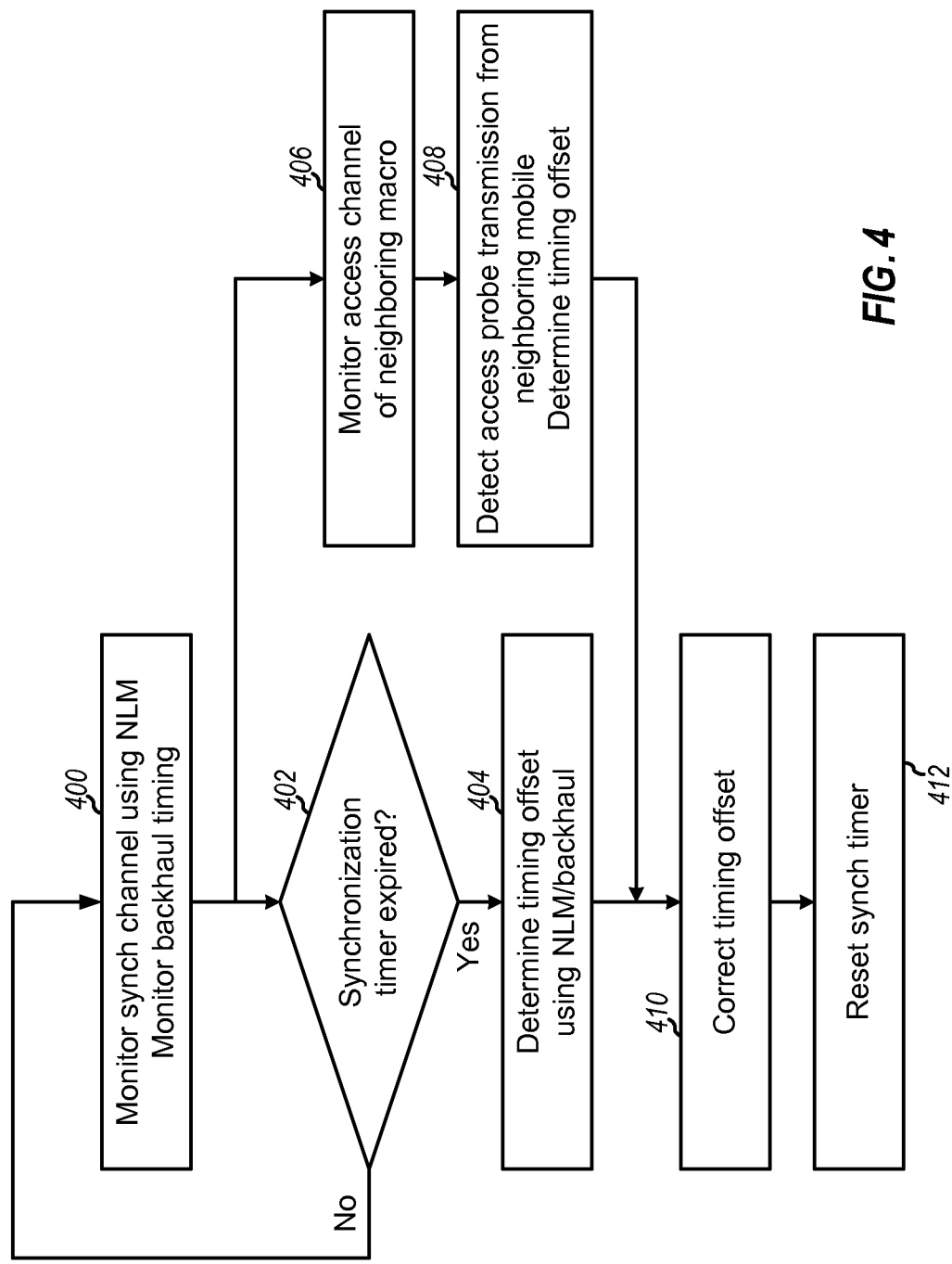
FIG. 4 is a functional block diagram conceptually illustrating functional blocks executed to implement one aspect of the disclosure.

FIG. 4 is a functional block diagram illustrating synchronization monitoring by a femtocell. In block 400, a femtocell monitors a synchronization channel using a network listen module (NLM), receiving GPS information, and/or monitoring backhaul timing. A determination is made at block 402 whether a synchronization timer has expired. If the timer has not expired, the femtocell continues to monitor the synchronization channel in block 400. Otherwise, if a determination is made, at block 402, that a synchronization timer has expired, then a timing offset is determined at block 404 using the NLM/GPS/backhaul. In addition, the femtocell may perform a parallel process in which it monitors an access channel of a neighboring macro base station at block 406. Upon detecting an access probe transmission from a neighboring mobile device, in block 408, the femtocell determines the timing offset from the information contained in the access probe transmission. At block 410, the femtocell utilizes either or both of the timing offsets determined in blocks 404 and 408 to correct a timing offset, and employs the corrected timing offset, in block 412, to reset a synchronization timer. Additionally or alternatively, the synchronization process may correct a frequency offset using the access probe detection. Thus, in some embodiments, blocks 404 and 408 may additionally or alternatively determine frequency offsets, blocks 408-412 may additionally or alternatively carry out frequency synchronization.

Regarding frequency synchronization, the local oscillator at the femtocell may drift with time, thereby leading to a frequency shift. The femtocell may routinely correct this frequency offset by synchronizing with a reference frequency source. Typically, GPS signals, backhaul, or network listen modules are used for synchronization of both timing and frequency. The disclosed method may also be used as an alternative for frequency synchronization.

During the access procedure, the UE sends an access preamble followed by the access capsule. Once the femtocell has successfully decoded the access preamble (and also the access capsule if it has the appropriate configuration parameters), the femtocell can determine the frequency offset by means of a frequency tracking loop (FTL). The FTL determines the frequency offset by comparing the phase of the received signals with the known reference values. The frequency offset correction process can be further enhanced by decoding multiple access probes from potentially different UEs.

In various alternative aspects, the femtocell may rely solely on the timing offset and/or frequency offset determined in block 408, and forego use of the network listen module, backhaul, or GPS. Thus, in such aspects, blocks 400-404 may not occur if, for example, the NLM is not working properly (e.g., weak signal coverage) or the femtocell has no NLM at all. The femtocell may also be configured to preferentially forego blocks 400-404 if it detects proximate mobile devices and/or access probes from such devices, or if it successfully synchronizes using sniffed access probes. In this manner, the femtocell can opportunistically avoid downlink silencing intervals through opportunistic access channel detecting, and by exploiting frequent access probe transmissions from frequently active smart phones, for example, in idle-mode. This capability may stem from the tendency of smartphones to run background applications, such as Facebook, Inc.'s FACEBOOK® and Twitter, Inc.'s TWITTER® applications, that often require periodic synchronization with the network server. In such cases, the smartphone periodically transitions from idle mode to download status updates. The phone uses access channel transmissions to set up the initial connection, and the femtocell can detect these transmissions for synchronization purposes.

Figure 5:
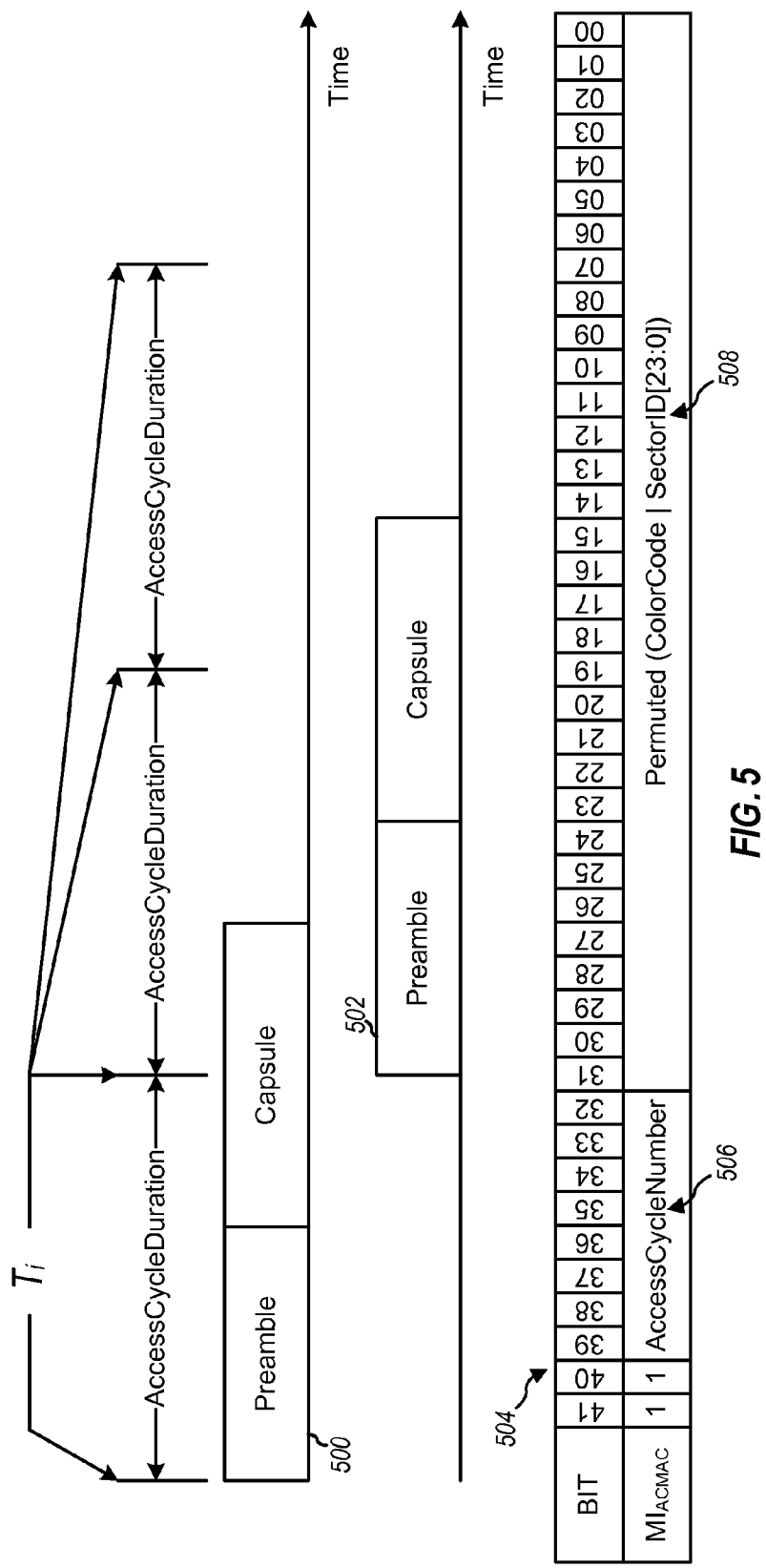
FIG. 5 is a graphical representation conceptually illustrating access probe transmission timing and long code mask according to one aspect of the disclosure.

FIG. 5 is a timing diagram illustrating access probe transmission timing on a Data Optimized (DO) access channel Media Access Control (MAC). Such access probe transmission timing may be governed by a system time modulus (e.g., mod). In particular, a mobile device (e.g., Access Terminal (AT)) may be configured to send an access probe only when:

$$\text{SystemTime mod AccessCycleDuration}=0; \text{ or} \quad (1)$$

$$\text{AccessCycleNumber}=\text{SystemTime mod 256}. \quad (2)$$

The AccessCycleDuration defines a timing interval resulting in various time instants T, at which the transmissions of the access probes can start. For example, an access probe 500 sent by a first AT can differ in Long Code Mask (LCM) 504 from a subsequent access probe 502 transmitted by a second AT. This difference in LCM 504 is due to the AccessCycleNumbers (ACNs) 506 being different; the other information 508 used by the macro base station (e.g., ColorCode and Sector ID) is fixed in time and only has to be acquired once by the femtocell. In contrast, the ACN is a function of CDMA system time, and, thus, changes over time.

In order to decode detected access probes and obtain the ACN and other information, the femtocell can receive the access channel parameters. The $MQ_{ACMAC}$ is derived from the $MI_{ACMAC}$, and the femtocell can know the permutation rule. Information received by the femtocell to decode an access probe can include: in-phase (I) and quadrature (Q) channel short pseudonoise (PN) sequence; I and Q channel access long code; preamble length; and ACN. To determine probe timing, the femtocell uses the CDMA system time when the access probe was transmitted. The AT can be configured to send this aiding information to the femtocell in response to a request for synchronization assistance from the femtocell. For small timing offsets, the femtocell can predict the ACN unambiguously. Thus, the aiding information can be sent one time to the femtocell from any AT on the femtocell, and the femtocell can thereafter detect and exploit access probes of any ATs communicating with the macro cell via the access channel. Additional details regarding femtocell timing maintenance can be found in co-pending U.S. patent application Ser. No. 13/037,598, entitled System and Method for Timing and Frequency Synchronization by a Femto Access Point, and filed by the assignee of the present application (i.e. Int. Pub. No. WO 2011/109466). The aforementioned U.S. Patent Application is incorporated by reference herein in its entirety for any and all purposes.

Figure 6:
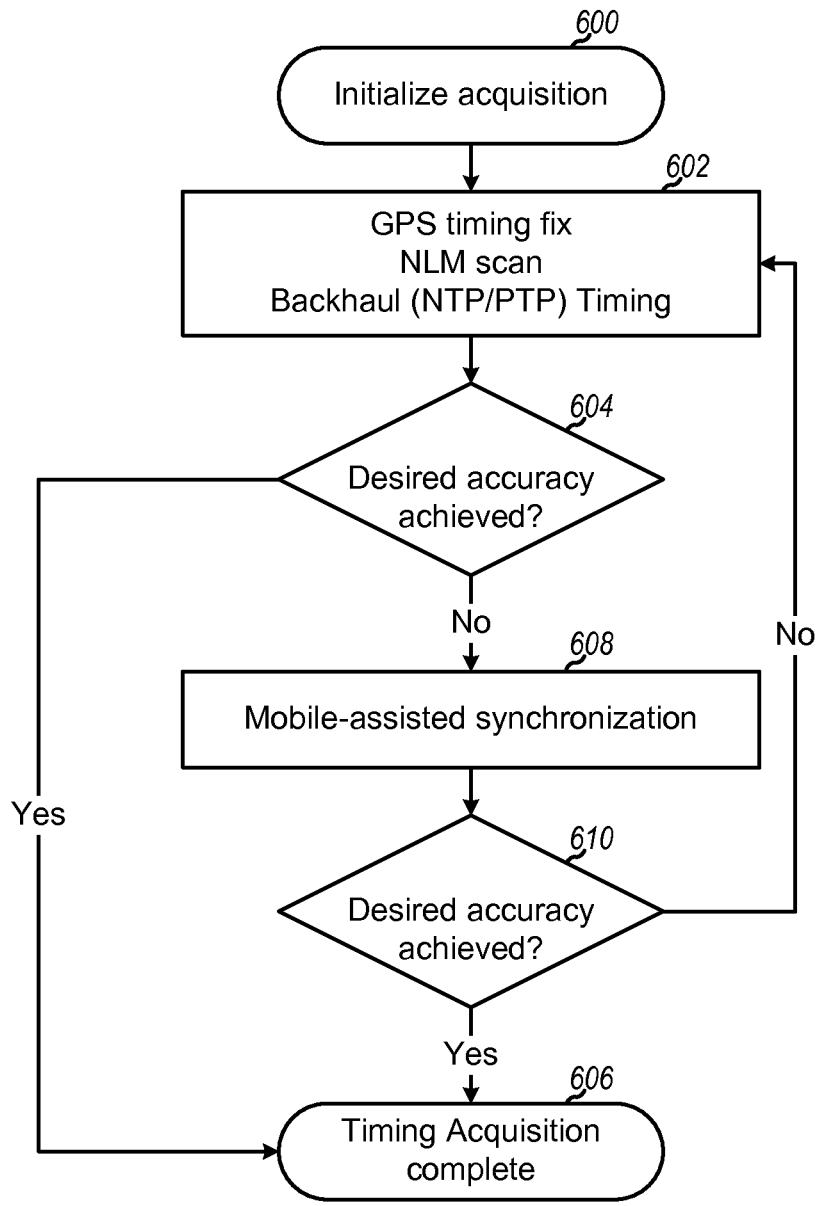
FIG. 6 is a functional block diagram conceptually illustrating functional blocks executed to implement one aspect of the disclosure.

FIG. 6 is a functional block diagram illustrating example blocks executed to implement one aspect of the present disclosure. In bock 600, the timing acquisition executed by a femtocell is initialized upon startup of the femtocell or upon loss of synchronization by the femtocell. An attempt is made, at block 602, to synchronize the femtocell via existing synchronization methods, such as GPS timing, NLM scan, and/or backhaul (NTP/PTP) timing. A determination is made, in block 604, whether the desired timing accuracy has been achieved. If so, then the timing acquisition can be completed at bock 606. Otherwise, if the desired accuracy has not been achieved, then, in block 608, a mobile-assisted synchronization is performed. An additional determination is made, at block 610, whether the desired accuracy has been achieved after the mobile-assisted synchronization of block 608. If so, then the timing acquisition can be completed at 606. Otherwise, the process returns to block 602 for further acquisition efforts.

It should be readily appreciated that alternative or additional embodiments may omit execution of some of these blocks or execute these blocks in different order (e.g., omit block 602 and block 604, or attempt block 608 first). The various aspects of the present disclosure are not limited to the illustrated example.

Figure 7:
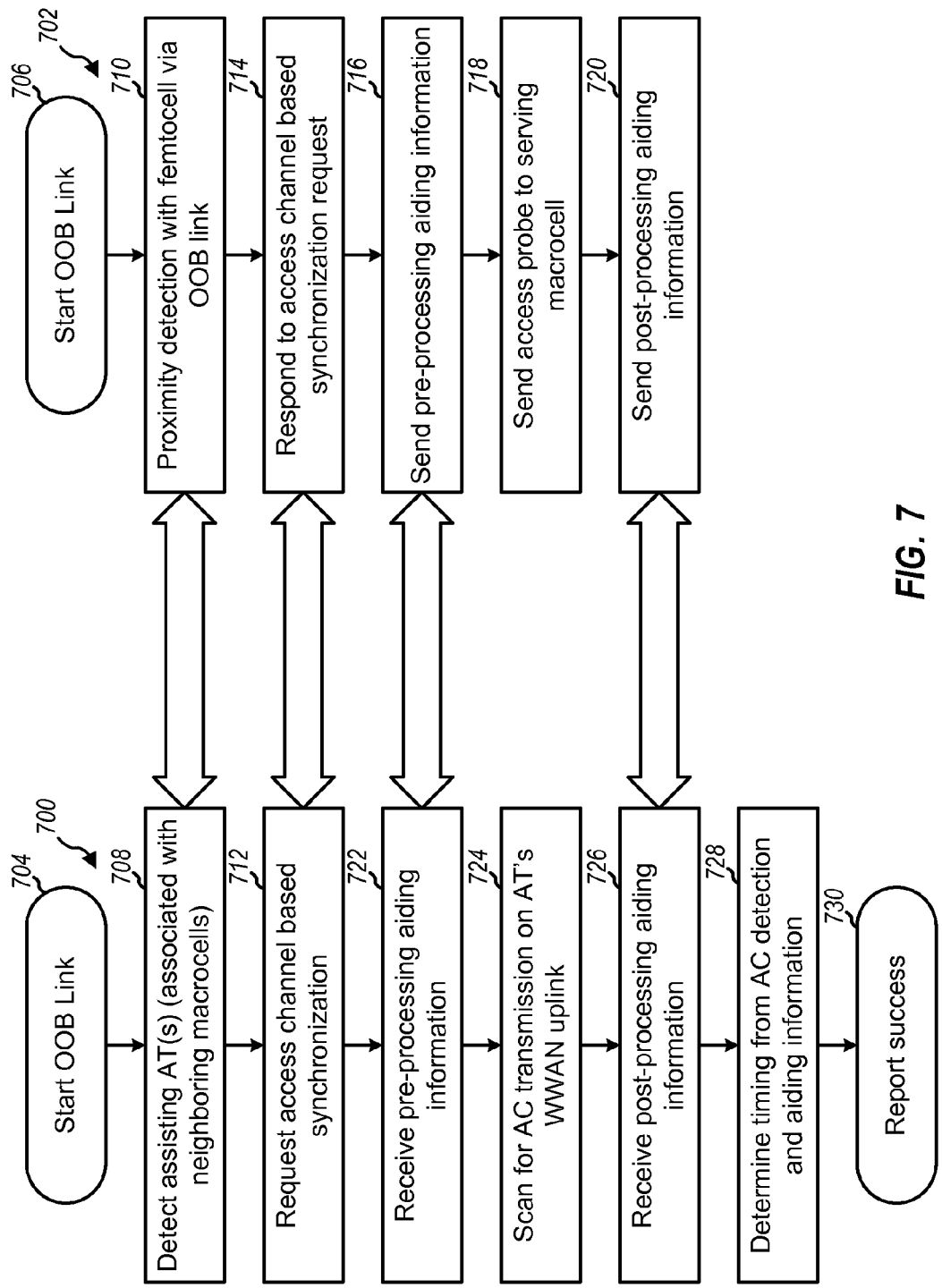
FIG. 7 is a functional block diagram conceptually illustrating functional blocks executed to implement one aspect of the disclosure.

FIG. 7 is a functional block diagram illustrating mobile-assisted synchronization including a process 700 carried out by a femtocell in concert with a process 702 carried out by a mobile device. Process 700 and process 702 initialize, at block 704 and block 706, respectively, by starting an out of band (OOB) link. Next, the femtocell detects assisting ATs associated with neighboring macrocells, at block 708, while the mobile device performs proximity detection with the femtocell via the OOB link at block 710. In one example, the assisting AT may belong to the owner of the femtocell. At the time of purchase of the femtocell, the owner may register his phone with the femtocell, thereby granting an association rule between the two devices that may aid in the OOB-based detection process. Then, the femtocell requests access channel based synchronization, at block 712, and the mobile device responds to the access based synchronization request at block 714. In further response to the access channel synchronization request, the mobile device sends pre-processing aiding information, at block 716, sends a gratuitous access probe to the serving macro base station, at block 718, and sends post-processing aiding information at block 720. Pre-processing aiding information may include access parameters that are not time dependent, such as in-phase (I) and quadrature (Q) channel short pseudonoise (PN) sequence, I and Q channel access long code, preamble length for EV-DO systems, etc. The gratuitous access probe sent in block 718 may be sent purely for the purpose of providing synchronization acquisition to the femtocell. Post-processing aiding information may include access parameters that are time dependent, such as AccessCycleNumber for EV-DO systems. In some embodiments, all access parameters can be sent as post-processing information, including the parameters that are not dependent on time. The femtocell receives the pre-processing aiding information, at block 722, and scans for the access probe transmission on the AT's WWAN uplink at block 724. In block 724, the femtocell can buffer in memory detected wireless wide area network (WWAN) signals, and receive the post-processing aiding information at block 726. With the access probe and aiding information in memory, the femtocell can use the aiding information to decode the buffered access probe and determine timing at block 728, and report success at block 730.

Figure 10:
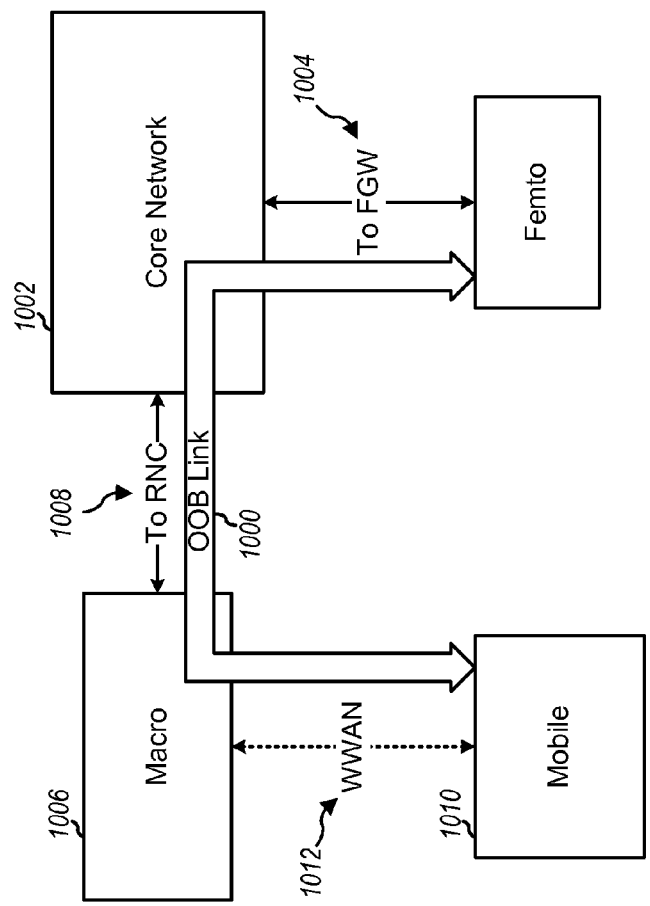
FIG. 10 is a block diagram conceptually illustrating a further example of an out of band link according to one aspect of the disclosure.

A number of options exist for establishing an OOB link. For example, turning to FIG. 8, an out of band link 800 may be accomplished through a router 802 that is connected to the mobile device 804 using a WIFI™ connection 806, and the router 802 may be connected to the femtocell 808 thru an Ethernet connection 810. In this example, the router 802, mobile device, 804, and femtocell 808 may all be in a same subnet 812. In another example, turning to FIG. 9, an out of band link 900 may be established via a WIFI™ connection 902. In this example, the femtocell 904 and the mobile device 906 may both have WIFI™ modems. Thus, the femtocell 904 may be equipped with its own WIFI™ modem 908. For initial startup, the femtocell 904 enables the OOB link even when the WWAN is not active. In a further example, referring to FIG. 10, an out of band link 1000 may be established through an internet protocol (IP) connection in a core network 1002. In this example, a femtocell 1004 may be connected to the core network 1002 by a Femto Gateway (FGW) 1004, and the core network 1002 can be connected to the macro base station 1006 through a Radio Network Controller (RNC) 1008. A mobile device 1010 may be connected to the macro base station 1012 by a WWAN 1012. In this example, both the mobile device 1010 and the femtocell 1004 can know and accept connection from respective IP addresses.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 4, FIG. 6, and FIG. 7 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm blocks described in connection with the disclosure herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The blocks of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
receiving, at a mobile device, a request for synchronization assistance from a proximate femtocell, wherein the request is received over an out of band (OOB) link;
transmitting an access probe to a serving macro base station in response to the request, wherein the access probe is a gratuitous access probe sent by the mobile device purely for the purpose of providing synchronization acquisition to the femtocell; and
transmitting aiding information to the proximate femtocell over the OOB link, wherein the aiding information assists the proximate femtocell in decoding the access probe transmitted by the mobile device to the serving macro base station.

2. The method of claim 1, further comprising:
performing proximity detection with the femtocell over the OOB link.

3. The method of claim 1, wherein the aiding information includes one or more of: in-phase (I) and quadrature (Q) channel short pseudonoise (PN) sequence; I and Q channel access long code; preamble length; access cycle number; or Code Division Multiple Access (CDMA) system time when the access probe was transmitted.

4. The method of claim 1, further comprising:
initiating the OOB link through a router that is connected to the mobile device by a WIFI™ connection, wherein the router is connected to the femtocell by an Ethernet connection.

5. The method of claim 1, further comprising:
initiating the OOB link through a WIFI™ connection, wherein the femtocell and the mobile device both have WIFI™ modems.

6. The method of claim 1, further comprising:
initiating the OOB link through an internet protocol (IP) connection in a core network, wherein the femtocell is connected to the core network by Femto Gateway (FGW), the core network is connected to the macro base station through Radio Network Controller (RNC), and the mobile device is connected to the macro base station by wireless wide area network (WWAN).

7. An apparatus configured for wireless communication, comprising:
means for receiving, at a mobile device, a request for synchronization assistance from a proximate femtocell, wherein the request is received over an out of band (OOB) link;
means for transmitting a gratuitous access probe to a serving macro base station in response to the request, wherein the gratuitous access probe is sent by the mobile device purely for the purpose of providing synchronization acquisition to the femtocell; and
means for transmitting aiding information to the proximate femtocell over the OOB link, wherein the aiding information assists the proximate femtocell in decoding the access probe transmitted by the mobile device to the serving macro base station.

8. The apparatus of claim 7, further comprising:
means for performing proximity detection with the femtocell over the OOB link.

9. The apparatus of claim 7, further comprising:
means for including in the aiding information at least one of the following: in-phase (I) and quadrature (Q) channel short pseudonoise (PN) sequence; I and Q channel access long code; preamble length; access cycle number; or Code Division Multiple Access (CDMA) system time when the access probe was transmitted.

10. The apparatus of claim 7, further comprising:
means for initiating the OOB link through a router that is connected to the mobile device by a WIFI™ connection, wherein the router is connected to the femtocell by an Ethernet connection.

11. The apparatus of claim 7, further comprising:
means for initiating the OOB link through a WIFI™ connection, wherein the femtocell and the mobile device both have WIFI™ modems.

12. The apparatus of claim 7, further comprising:
means for initiating the OOB link through an internet protocol (IP) connection in a core network, wherein the femtocell is connected to the core network by Femto Gateway (FGW), the core network is connected to the macro base station through Radio Network Controller (RNC), and the mobile device is connected to the macro base station by wireless wide area network (WWAN).

13. A computer program product for wireless communications in a wireless network, comprising:
a non-transitory computer-readable medium having program code recorded thereon, the program code including:
program code to receive, at a mobile device, a request for synchronization assistance from a proximate femtocell, wherein the request is received over an out of band (OOB) link;
program code to transmit an access probe to a serving macro base station in response to the request, wherein the access probe is a gratuitous access probe sent by the mobile device purely for the purpose of providing synchronization acquisition to the femtocell; and
program code to transmit aiding information to the proximate femtocell over the OOB link, wherein the aiding information assists the proximate femtocell in decoding the access probe transmitted by the mobile device to the serving macro base station.

14. The computer program product of claim 13, further comprising:
program code to perform proximity detection with the femtocell over the OOB link.

15. The computer program product of claim 13, wherein the aiding information includes at least one of the following: in-phase (I) and quadrature (Q) channel short pseudonoise (PN) sequence; I and Q channel access long code; preamble length; access cycle number; or CDMA system time when the access probe was transmitted.

16. The computer program product of claim 13, further comprising:
program code to initiate the OOB link through a router that is connected to the mobile device by a WIFI™ connection, wherein the router is connected to the femtocell by an Ethernet connection.

17. The computer program product of claim 13, further comprising:
program code to initiate the OOB link through a WIFI™ connection, wherein the femtocell and the mobile device both have WIFI™ modems.

18. The computer program product of claim 13, further comprising:
program code to initiate the OOB link through an internet protocol (IP) connection in a core network, wherein the femtocell is connected to the core network by Femto Gateway (FGW), the core network is connected to the macro base station through Radio Network Controller (RNC), and the mobile device is connected to the macro base station by wireless wide area network (WWAN).

19. An apparatus configured for wireless communication, the apparatus comprising:
at least one processor; and
a memory coupled to the at least one processor,
wherein the at least one processor is configured:
to receive, at a mobile device, a request for synchronization assistance from a proximate femtocell, wherein the request is received over an out of band (OOB) link;
to transmit an access probe to a serving macro base station in response to the request, wherein the access probe is a gratuitous access probe sent by the mobile device purely for the purpose of providing synchronization acquisition to the femtocell; and
to transmit aiding information to the proximate femtocell over the OOB link, wherein the aiding information assists the proximate femtocell in decoding the access probe transmitted by the mobile device to the serving macro base station.

20. The apparatus of claim 19, wherein the at least one processor is further configured:
to perform proximity detection with the femtocell over the OOB link.

21. The apparatus of claim 19, wherein the at least one processor is further configured:
to include in the aiding information at least one of the following: in-phase (I) and quadrature (Q) channel short pseudonoise (PN) sequence; I and Q channel access long code; preamble length; access cycle number; or CDMA system time when the access probe was transmitted.

22. The apparatus of claim 19, wherein the at least one processor is further configured:
to initiate the OOB link through a router that is connected to the mobile device by a WIFI™ connection, wherein the router is connected to the femtocell by an Ethernet connection.

23. The apparatus of claim 19, wherein the at least one processor is further configured:
to initiate the OOB link through a WIFI™ connection, wherein the femtocell and the mobile device both have WIFI™ modems.

24. The apparatus of claim 19, wherein the at least one processor is further configured:
to initiate the OOB link through an internet protocol (IP) connection in a core network, wherein the femtocell is connected to the core network by FGW, the core network is connected to the macro base station through RNC, and the mobile device is connected to the macro base station by WWAN.

25. A method of wireless communication, comprising:
detecting, by a femtocell, one or more access probes transmitted from one or more proximate mobile devices to one or more serving macro base stations thereof, wherein the one or more access probes are one or more gratuitous access probes sent by the one or more proximate mobile devices purely for the purpose of providing synchronization acquisition to the femtocell;
determining at least one of access probe transmission time or frequency based on the one or more access probes; and
synchronizing at least one of timing or frequency at the femtocell using the determined at least one of access probe transmission time or frequency, wherein the synchronizing comprises initializing at least one of the timing or frequency using the at least one of access probe transmission time or frequency.

26. The method of claim 25, wherein the determining comprises:
obtaining aiding information for decoding the one or more access probes; and
decoding the one or more access probes using the aiding information;
determining the at least one of access probe transmission time or frequency based on the decoded one or more access probes.

27. The method of claim 26, wherein the aiding information is obtained from one or more of:
the one or more proximate mobile devices;
backhaul communication from an associated macro base station; and
signal transmissions from the associated macro base station.

28. The method of claim 25, further comprising:
prior to the detecting, requesting synchronization assistance from the proximate mobile device using an out of band (OOB) link;
buffering detected wireless wide area network (WWAN) signals received after the requesting;
obtaining aiding information for decoding the one or more access probes; and
identifying the access probe in the buffered WWAN signals using the aiding information, wherein the femtocell further uses the aiding information to decode the one or more access probes.

29. The method of claim 28, further comprising:
detecting, by the femtocell, an additional access probe after expiration of a synchronization timer;
decoding the additional access probe to determine an additional at least one of access probe transmission time or frequency, wherein the femtocell uses the aiding information in the decoding; and
correcting the at least one of timing or frequency of the femtocell with an offset based on the additional at least one of access probe transmission time or frequency.

30. The method of claim 28, further comprising:
initiating the OOB link through a router that is connected to the mobile device by a WIFI™ connection, wherein the router is connected to the femtocell by an Ethernet connection.

31. The method of claim 28, further comprising:
initiating the OOB link through a WIFI™ connection, wherein the femtocell and the mobile device both have WIFI™ modems.

32. The method of claim 28, further comprising:
initiating the OOB link through an internet protocol (IP) connection in a core network, wherein the femtocell is connected to the core network by Femto Gateway (FGW), the core network is connected to the macro base station through Radio Network Controller (RNC), and the mobile device is connected to the macro base station by wireless wide area network (WWAN).

33. An apparatus configured for wireless communication, comprising:
means for detecting, by a femtocell, one or more access probes transmitted from one or more proximate mobile devices to one or more serving macro base stations thereof, wherein the one or more access probes are one or more gratuitous access probes sent by the one or more proximate mobile devices purely for the purpose of providing synchronization acquisition to the femtocell;
means for determining at least one of access probe transmission time or frequency based on the one or more access probes; and
means for synchronizing at least one of timing or frequency at the femtocell using the determined at least one of access probe transmission time or frequency, wherein the means for synchronizing comprises means for initializing the at least one of timing or frequency using the at least one of access probe transmission time or frequency.

34. The apparatus of claim 33, wherein the means for determining comprises:
means for obtaining aiding information for decoding the one or more access probes;
means for decoding the one or more access probes using the aiding information; and
means for determining the at least one of access probe transmission time or frequency based on the decoded one or more access probes.

35. The apparatus of claim 34, wherein the aiding information is obtained from one or more of:
the one or more proximate mobile devices;
backhaul communication from an associated macro base station; and
signal transmissions from the associated macro base station.

36. The apparatus of claim 33, further comprising:
means, executable prior to the means for detecting, for requesting synchronization assistance from the proximate mobile device using an out of band (OOB) link;
means for buffering detected wireless wide area network (WWAN) signals received after the means for requesting;
means for obtaining aiding information for decoding the one or more access probes; and
means for identifying the access probe in the buffered WWAN signals using the aiding information, wherein the femtocell further uses the aiding information to decode the one or more access probes.

37. The apparatus of claim 36, further comprising:
means for detecting, by the femtocell, an additional access probe after expiration of a synchronization timer;
means for decoding the additional access probe to determine an additional at least one of access probe transmission time or frequency, wherein the femtocell uses the aiding information in the means for decoding; and
means for correcting the at least one of timing or frequency of the femtocell with an offset based on the additional at least one of access probe transmission time or frequency.

38. The apparatus of claim 36, further comprising:
means for initiating the OOB link through a router that is connected to the mobile device by a WIFI™ connection, wherein the router is connected to the femtocell by an Ethernet connection.

39. The apparatus of claim 36, further comprising:
means for initiating the OOB link through a WIFI™ connection, wherein the femtocell and the mobile device both have WIFI™ modems.

40. The apparatus of claim 36, further comprising:
means for initiating the OOB link through an internet protocol (IP) connection in a core network, wherein the femtocell is connected to the core network by Femto Gateway (FGW), the core network is connected to the macro base station through Radio Network Controller (RNC), and the mobile device is connected to the macro base station by wireless wide area network (WWAN).

41. A computer program product for wireless communications in a wireless network, comprising:
a non-transitory computer-readable medium having program code recorded thereon, the program code including:
program code to detect, by a femtocell, one or more gratuitous access probes transmitted from one or more proximate mobile devices to one or more serving macro base stations thereof, wherein the one or more access probes are one or more gratuitous access probes sent by the one or more proximate mobile devices purely for the purpose of providing synchronization acquisition to the femtocell;
program code to determine at least one of access probe transmission time or frequency based on the one or more access probes; and
program code to synchronize at least one of timing or frequency at the femtocell using the determined at least one of access probe transmission time or frequency, wherein the program code to synchronize comprises program code to initialize the at least one of timing or frequency using the at least one of access probe transmission time or frequency.

42. The computer program product of claim 41, wherein the program code to determine comprises:
program code to obtain aiding information for decoding the one or more access probes;
program code to decode the one or more access probes using the aiding information; and
program code to determine the at least one of access probe transmission time or frequency based on the decoded one or more access probes.

43. The computer program product of claim 42, wherein the aiding information is obtained from one or more of:
the one or more proximate mobile devices;
backhaul communication from an associated macro base station; and
signal transmissions from the associated macro base station.

44. The computer program product of claim 41, further comprising:
program code, executable prior to the program code to detect, to request synchronization assistance from the proximate mobile device using an out of band (OOB) link;
program code to buffer detected wireless wide area network (WWAN) signals received after the program code to request;
program code to obtain aiding information for decoding the one or more access probes; and
program code to identify the access probe in the buffered WWAN signals using the aiding information, wherein the femtocell further uses the aiding information to decode the one or more access probes.

45. The computer program product of claim 44, further comprising:
program code to detect, by the femtocell, an additional access probe after expiration of a synchronization timer;

program code to decode the additional access probe to determine an additional at least one of access probe transmission time or frequency, wherein the femtocell uses the aiding information in the program code to decode; and program code to correct the at least one of timing or frequency of the femtocell with an offset based on the additional at least one of access probe transmission time or frequency.

46. The computer program product of claim 44, further comprising:

program code to initiate the OOB link through a router that is connected to the mobile device by a WIFI™ connection, wherein the router is connected to the femtocell by an Ethernet connection.

47. The computer program product of claim 44, further comprising:

program code to initiate the OOB link through a WIFI™ connection, wherein the femtocell and the mobile device both have WIFI™ modems.

48. The computer program product of claim 44, further comprising:

program code to initiate the OOB link through an internet protocol (IP) connection in a core network, wherein the femtocell is connected to the core network by Femto Gateway (FGW), the core network is connected to the macro base station through Radio Network Controller (RNC), and the mobile device is connected to the macro base station by wireless wide area network (WWAN).

49. An apparatus configured for wireless communication, the apparatus comprising:

at least one processor; and a memory coupled to the at least one processor, wherein the at least one processor is configured:

to detect, by a femtocell, one or more gratuitous access probes transmitted from one or more proximate mobile devices to one or more serving macro base stations thereof, wherein the one or more access probes are one or more gratuitous access probes sent by the one or more proximate mobile devices purely for the purpose of providing synchronization acquisition to the femtocell;

to determine at least one of access probe transmission time or frequency based on the one or more access probes; and to synchronize at least one of timing or frequency at the femtocell using the determined at least one of access probe transmission time or frequency, wherein the configuration to synchronize comprises configuration to initialize the at least one of timing or frequency using the at least one of access probe transmission time or frequency.

50. The apparatus of claim 49, wherein the configuration of the at least one processor to determine comprises configuration:

to obtain aiding information for decoding the one or more access probes;

to decode the one or more access probes using the aiding information; and to determine the at least one of access probe transmission time or frequency based on the decoded one or more access probes.

51. The apparatus of claim 50, wherein the aiding information is obtained from one or more of:

the one or more proximate mobile devices;

backhaul communication from an associated macro base station; and signal transmissions from the associated macro base station.

52. The apparatus of claim 49, wherein the at least one processor is further configured:

to request synchronization assistance, prior to the configuration to detect, from the proximate mobile device using an out of band (OOB) link;

to buffer detected wireless wide area network (WWAN) signals received after the configuration to request;

to obtain aiding information for configuration to decode the one or more access probes; and to identify the access probe in the buffered WWAN signals using the aiding information, wherein the femtocell further uses the aiding information to decode the one or more access probes.

53. The apparatus of claim 52, wherein the at least one processor is further configured:

to detect, by the femtocell, an additional access probe after expiration of a synchronization timer;

to decode the additional access probe to determine an additional at least one of access probe transmission time or frequency, wherein the femtocell uses the aiding information in the configuration to decode; and to correct the at least one of timing or frequency of the femtocell with an offset based on the additional at least one of access probe transmission time or frequency.

54. The apparatus of claim 52, wherein the at least one processor is further configured:

to initiate the OOB link through a router that is connected to the mobile device by a WIFI™ connection, wherein the router is connected to the femtocell by an Ethernet connection.

55. The apparatus of claim 52, wherein the at least one processor is further configured:

to initiate the OOB link through a WIFI™ connection, wherein the femtocell and the mobile device both have WIFI™ modems.

56. The apparatus of claim 52, wherein the at least one processor is further configured:

to initiate the OOB link through an internet protocol (IP) connection in a core network, wherein the femtocell is connected to the core network by Femto Gateway (FGW), the core network is connected to the macro base station through Radio Network Controller (RNC), and the mobile device is connected to the macro base station by wireless wide area network (WWAN).

* * * * *